United States Patent [19]
Sawtelle

[11] Patent Number: 5,562,311
[45] Date of Patent: Oct. 8, 1996

[54] COUPLING FOR AN END OF A HOSE

[75] Inventor: Donald K. Sawtelle, Jaffrey, N.H.

[73] Assignee: Jaffrey Fire Protection Company, Inc., Jaffrey, N.H.

[21] Appl. No.: 396,538

[22] Filed: Feb. 15, 1995

[51] Int. Cl.[6] .................................................. F16L 33/22
[52] U.S. Cl. .......................... 285/249; 285/255; 285/421
[58] Field of Search .............................. 285/18, 249, 255, 285/339, 342, 343, 421

[56] References Cited

U.S. PATENT DOCUMENTS

| | | | |
|---|---|---|---|
| 2,880,020 | 3/1959 | Audette | 285/255 |
| 2,940,778 | 6/1960 | Kaiser | 285/255 |
| 4,634,153 | 1/1987 | Kisnton | 285/255 |
| 5,186,503 | 2/1993 | Von Feilitzen | 285/255 |
| 5,286,072 | 2/1994 | Ruppert et al. | 285/249 |

FOREIGN PATENT DOCUMENTS

| | | | |
|---|---|---|---|
| 598714 | 2/1948 | France | 285/255 |
| 1163620 | 2/1964 | Germany | 285/255 |
| 524816 | 11/1957 | Italy | 285/255 |
| 29250 | 12/1897 | United Kingdom | 285/255 |
| 131197 | 8/1919 | United Kingdom | 285/249 |

Primary Examiner—Eric K. Nicholson
Attorney, Agent, or Firm—Davis, Bujold & Streck, PA

[57] ABSTRACT

A coupling for connection to an end of a hose to allow fluid to pass therethrough. The coupling comprises a tapered end inserted into the end of the hose and a tapered collar fitted on the outside of the hose. Once assembled, the collar provides uniform compression of the hose about the tapered end thereby preventing detachment or leakage. The coupling is designed such that it can be field installed and uninstalled without the need for specialized installation tools.

10 Claims, 5 Drawing Sheets

COUPLING FOR AN END OF A HOSE

This invention relates to a coupling for connection to an end of a hose. In particular, though not exclusively, the coupling comprises a pigtail inserted into the end of the hose and a collar fitted on the outside of the hose. Once assembled, the collar provides uniform compression of the hose about the pigtail. The invention also includes disassembly features.

BACKGROUND OF THE INVENTION

Hose couplings are currently available. A typical example are those found on garden hoses. However, these couplings cannot provide uniform compression of the hose about the coupling mainly because the collar used to compress the hose is a two piece construction having no taper whereby the two halves wrap around the outside of the hose. Further, the screws used to connect the two halves, and provide the necessary compression force, are located in a line perpendicular to the longitudinal axis of the coupling and hose. This assembly results in uneven compression of the hose and thereby lends to inadvertent leakage.

In the fire protection industry, couplings exist which address these concerns. However, the design of these couplings does not lend itself to field installation. Usually, special tools are required and assembly or disassembly can only be performed at the factory. The result is that the coupling and hose assembly becomes a specific item suited for a specific purpose.

No couplings exist which provide uniform compression to prevent leakage as well as be field installable, replaceable and adaptable.

OBJECT OF THE INVENTION

Accordingly, it is an object of the present invention to provide coupling having a uniform compression of a hose about the coupling thereby preventing inadvertent leakage.

Another object of the invention is to provide a coupling that is field installable without the need for specialized tools.

SUMMARY OF THE INVENTION

According to the invention there is provided a coupling (10) for connection to an end of a hose (12) comprising a collar (13), said collar (13) defining an axis and having a tapered internal surface (17) for placement over an end of such a hose (12) with a large end of the tapered internal surface (17) closest to the end of that hose (12); a hollow pigtail (11) defining an axis coaxial with the collar axis and having a tapered outer surface (14), for insertion into the end of such a hose (12), at one end thereof and a support ring (18) at an opposite end, said support ring (18) being connected to said collar (13) with the taper on said internal surface (17) being substantially parallel to the taper on said tapered outer surface (14), the tapers being dimensioned to cooperate with each other to clamp such a hose (12) throughout an overlapping length of said tapers; and, at least two threaded fasteners (20) connecting said collar (13) to said support ring (18) of said pigtail (11) with the end of such a hose (12) clamped between the tapers thereof, said fasteners (20) extending through clearance holes (19) in one of said collar (13) and said support ring (18) and threadingly engaging threaded holes (21) in the other of said collar (13) and said support ring (18), said holes (19, 21) each lying along an axis substantially parallel to each said pigtail axis and said coupling axis and being disposed to provide the desired clamping action.

According to the invention there is also provided a coupling (10) for connection to an end of a hose (12) comprising a collar (13), said collar (13) defining an axis and having a tapered internal surface (17) for placement over an end of such a hose (12) with a large end of the tapered internal surface (17) closest to the end of that hose (12); a hollow pigtail (11) defining an axis coaxial with the collar axis and having a tapered outer surface (14), for insertion into the end of such a hose (12), at one end thereof and a support ring (18) at an opposite end, said support ring (18) being connected to said collar (13) with the taper on said internal surface (17) being substantially parallel to the taper on said tapered outer surface (14), the tapers being dimensioned to cooperate with each other to clamp such a hose (12) throughout an overlapping length of said tapers; at least two first threaded fasteners (20) connecting said collar (13) to said support ring (18) of said pigtail (11) with the end of such a hose (12) clamped between the tapers thereof, said first fasteners (20) extending through threaded clearance holes (19), without engaging the threads thereof, in one of said collar (13) and said support ring (18) and threadingly engaging threaded holes (21) in the other of said collar (13) and said support ring (18), said holes (19, 21) each lying along an axis substantially parallel to each said pigtail axis and said coupling axis and being disposed to provide the desired clamping action; and, at least two second threaded fasteners (28) larger in diameter than the first threaded fasteners (20) to threadingly engaging said threaded clearance holes (19), upon removal of the first threaded fasteners (20) to push said collar (13) and said support ring (18) apart relative to one another to remove said collar (13) from said pigtail (11) to facilitate disassembly of said coupling (10) from a hose (12) clamped between the tapers.

According to the invention there is also provided a kit of parts for use as a coupling to an end of a hose comprising a collar (13), said collar (13) defining an axis and having a tapered internal surface (17) for placement over an end of such a hose (12) with a large end of the tapered internal surface (17) closest to the end of that hose (12); a hollow pigtail (11) defining an axis and having a tapered outer surface (14) at one end thereof and a support ring (18) at an opposite end, for insertion into the end of such a hose (12), for connection to said collar (13) with the said taper on said internal surface (17) substantially parallel to the taper on said tapered outer surface (14) to clamp such a said hose (12) throughout an overlapping length of the tapers; at least two first threaded fasteners (20) for connecting said collar (13) to said support ring (18) of said pigtail (11) to clamp the end of such a hose (12) between the tapers, said first fasteners (20) extending through threaded clearance holes (19), without engaging the threads thereof, in one of said collar (13) and said support ring (18) and threadingly engaging threaded holes (21) in the other of said collar (13) and said support ring (18), said holes (19, 21) each lying along an axis substantially parallel to each said pigtail axis and said coupling axis, and being disposed to provide the desired clamping action; and, at least two second threaded fasteners (28) larger in diameter than said first threaded fasteners (20) for threadingly engaging said threaded clearance holes (19) to push said collar (13) and said support ring (18) apart relative to one another to remove said collar (13) from said pigtail (11) to facilitate disassembly of said coupling (10) from a hose (12) when clamped between the tapers.

According to the invention there is also provided a method of assembling and disassembling a coupling for a hose, said coupling comprising a) a collar (13) and a hollow pigtail having cooperating tapers to clamp said hose (12) throughout an overlapping length of said tapers; b) at least two, first threaded fasteners (20) connecting said collar (13) to said support ring (18) to clamp an end of such a hose (12) between said tapers thereof, the first fasteners (20) extending through threaded clearance holes (19) in one of said collar (13) and said support ring (18) without the threads of said first fasteners (20) threadingly engaging the threads in said threaded clearance holes (19); and, c) at least two second threaded fasteners (28) larger in diameter than that of said first threaded fasteners (20) to threadingly engaging said threaded clearance holes (19) to push said collar (13) and said support ring (18) apart relative to the other to disassemble said collar (13) from said pigtail (11), said assembly comprises the steps of a) inserting said collar (13) over said end of such a hose (12) such that a larger end of said taper is adjacent the end of said hose (12) and inserting said tapered end (14) of said pigtail (11) into the end of said hose (12); b) inserting at least two first threaded fasteners (20) through said threaded clearance holes (19) of one of said collar (13) and said support ring (18) and threading these into said threaded holes (21) in the other of said collar (13) and said support ring (18); and, c) tightening said threaded fasteners (20) until the taper clamp the hose end; and disassembly comprises the steps of d) removing said first fasteners (20) from said threaded holes (21) with the hose end clamped between the tapers; e) threading at least two second fasteners (28) into threaded clearance holes (19) in one of said collar (13) and said support ring (18); and, f) turning said second fasteners (28) to push said collar (13) and said support ring (18) apart relative to one another to remove said collar (13) from said pigtail (11).

BRIEF INTRODUCTION TO THE DRAWINGS

The invention will now be described, by way of example, with reference to the accompanying drawings, in which.

DETAILED DESCRIPTION OF THE INVENTION

Figure 1:
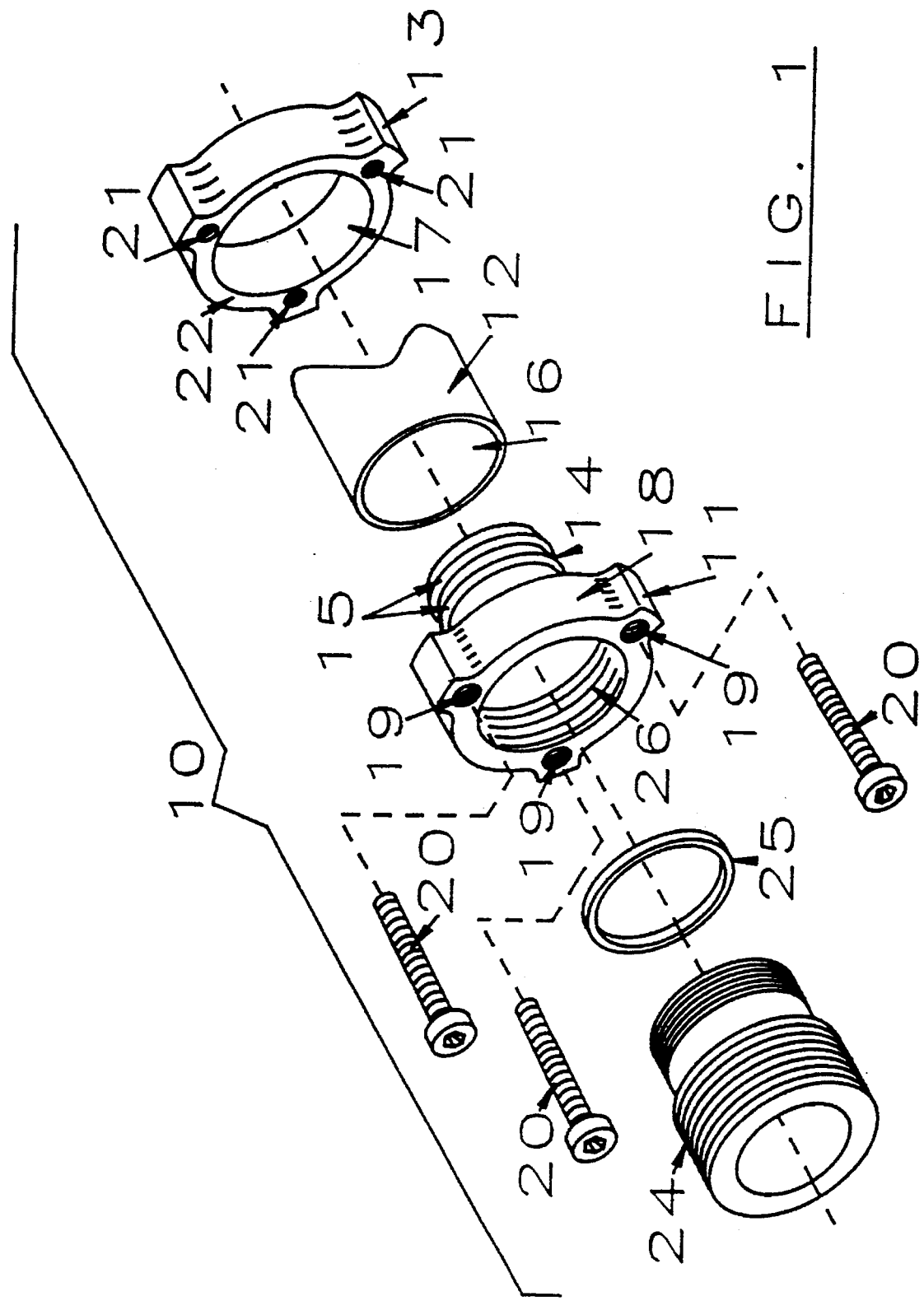
FIG. 1 is an exploded perspective view of the present invention.

Turning first to FIGS. 1–5, there is shown the coupling 10 of the present invention. The coupling 10 comprises a hollow pigtail 11 to be inserted into the end of a hose 12 and a collar 13 to be fitted over the end of the hose 12. The pigtail 11 is bored to allow passage of fluid through the coupling and has a tapered hose insert end 14 having a plurality of step cuts 15 about its periphery to aid in gripping the internal wall 16 of the hose 12. The outer periphery of end 14 and the internal wall 17 of collar 13 are similarly tapered. That is, end 14 and wall 17 have parallel slopes where the taper is at least 1 in 7, preferably 1 in 20 (or 0.050 inches per inch) so as to provide a tight grip both within and about the hose 12 once assembled. The length of the tapered end 14 along the longitudinal axis is about the same as the nominal diameter of the hose 12.

The pigtail 11 also has a support ring 18 having three symmetrically disposed threaded clearance holes 19 therein. The threaded clearance holes 19 lie along axes equi-spaced from and parallel to the longitudinal axis of the pigtail 11 and provides clearance for cap screws 20 (only two of which are shown for clarity) to pass therethrough without engaging the threads. The cap screws 20 threadingly engage threaded holes 21 of collar 13. The purpose of the threaded clearance holes 19 will become apparent with reference to FIG. 6.

To assemble the coupling 10, the collar 13 is slipped over the end of the hose 12 with the large end of the tapered wall 17 closest to that end of the hose 12. The tapered end 14 is inserted into the open end of the hose 12. Cap screws 20 are then inserted through threaded holes 19 to engage threaded holes 21 of collar 13. The cap screws 20 are then tightened to draw the collar 13 toward the pigtail 11 until the face 22 of the collar 13 abuts the stop 23 of the pigtail 11. The tapered end 14 and the internal wall 17 of collar 13 provides uniform compression of the hose 12 within the coupling 10 to prevent the hose 12 from detaching or leaking while in use.

Figure 2:
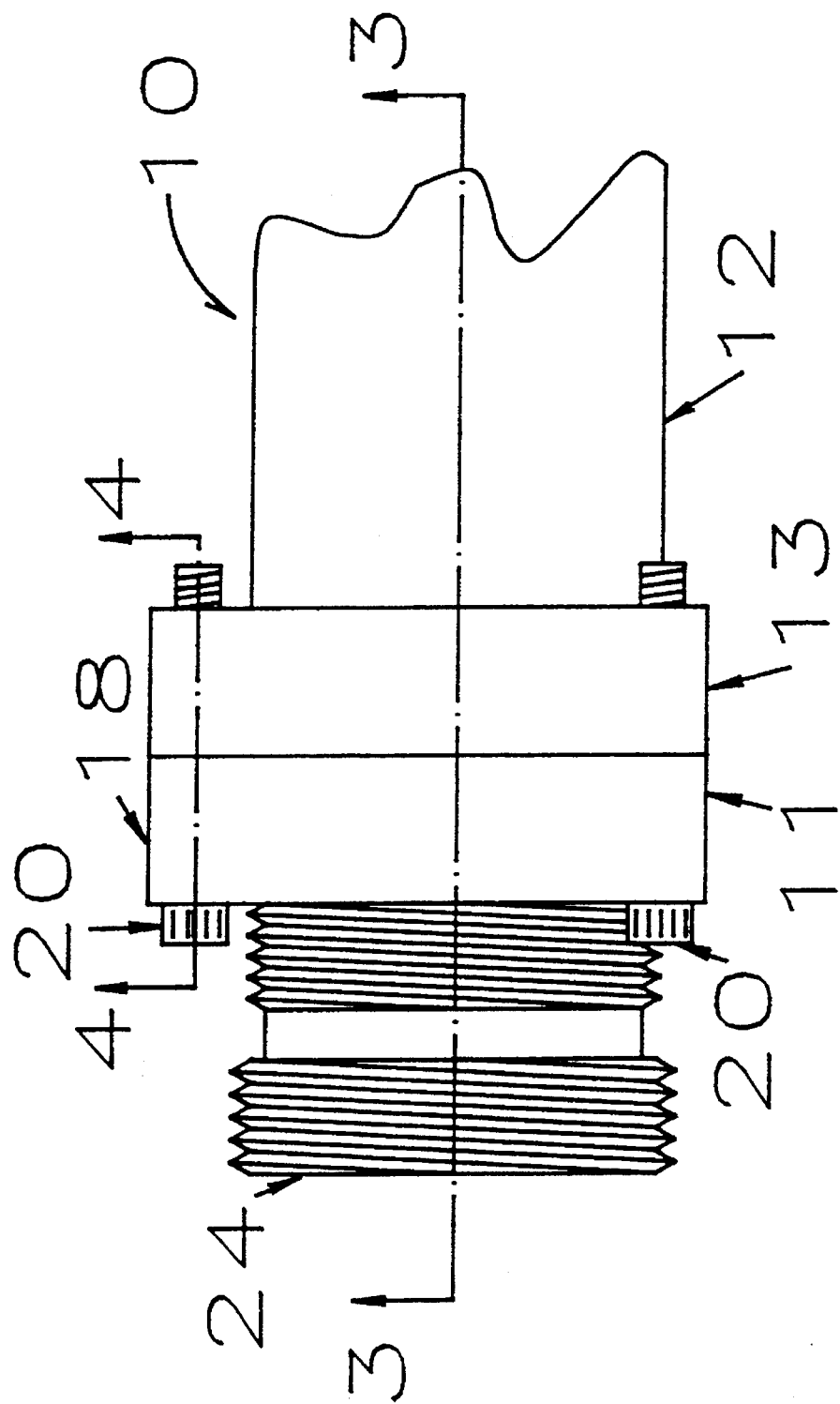
FIG. 2 is a side view of the present invention shown in assembled form.
Figure 3:
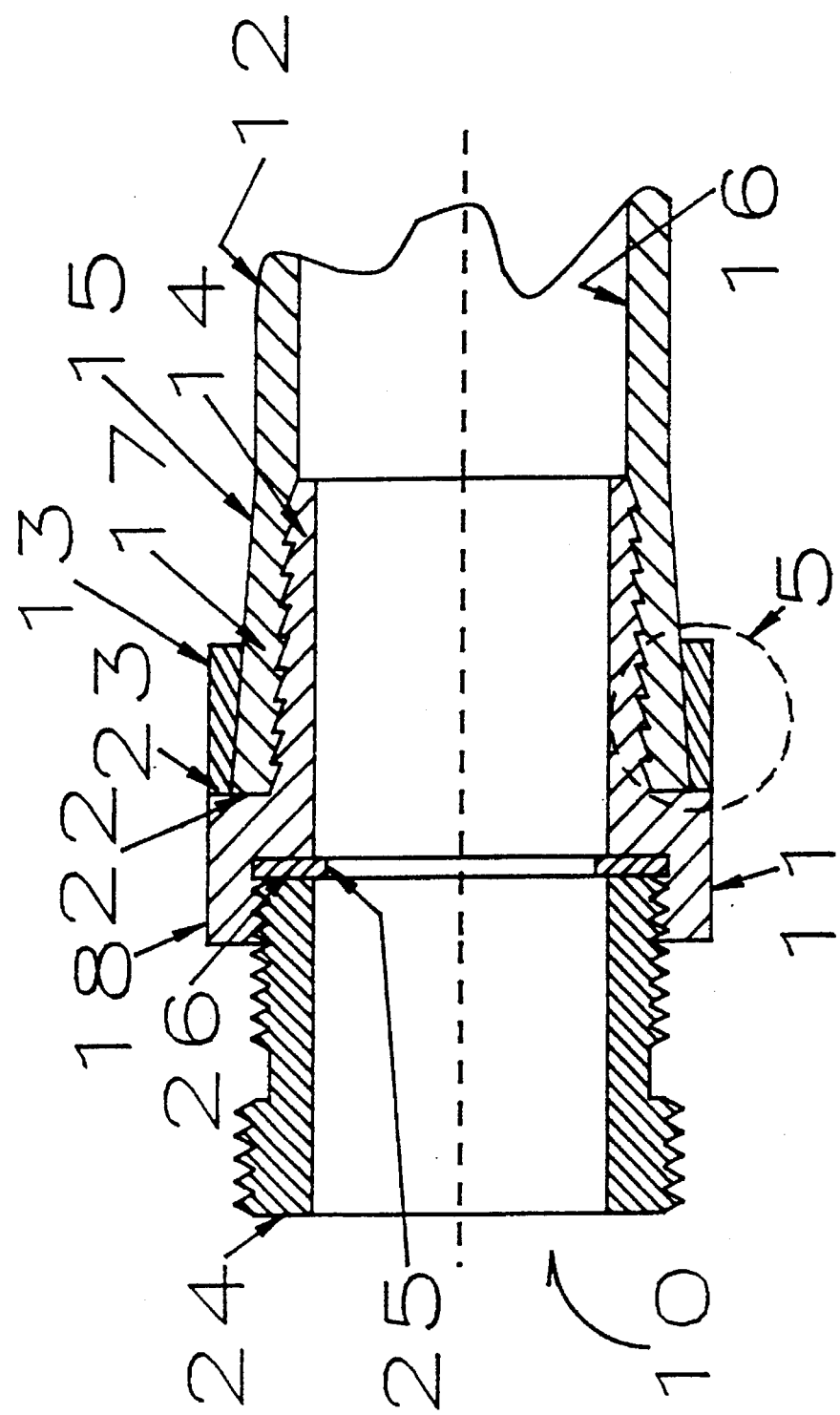
FIG. 3 is a section view of the present invention taken on section line 3—3 of FIG. 2.
Figure 4:
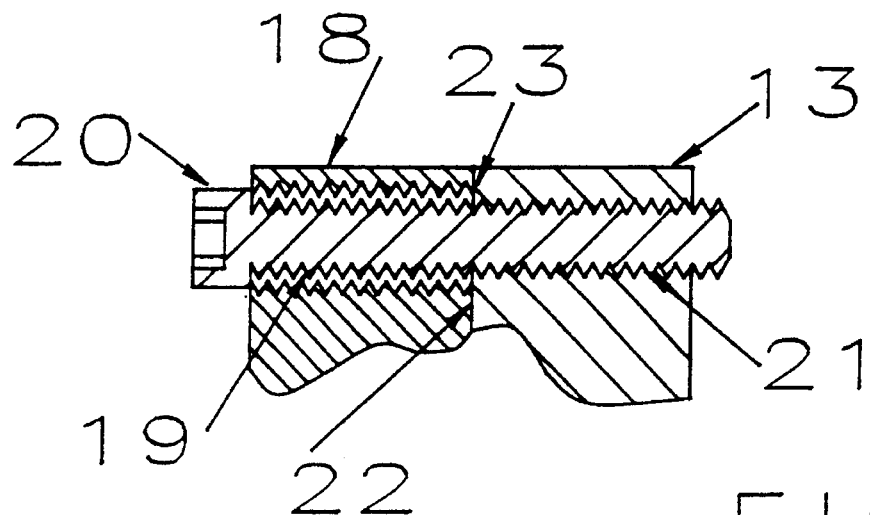
FIG. 4 is a section view of the present invention taken on section line 4—4 of FIG. 2.
Figure 5:
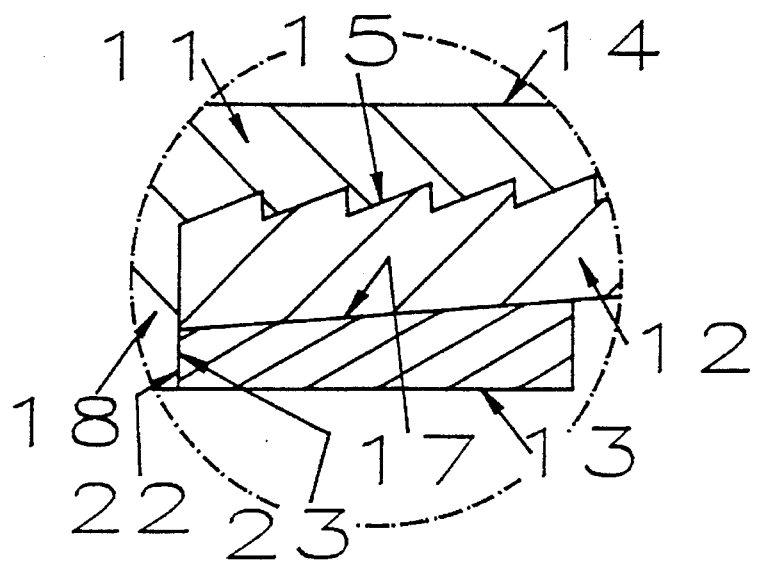
FIG. 5 is an enlarged view encircled by line 5 of FIG. 3.

The assembled view is shown in FIG. 2. In FIG. 3, it can be seen that the hose 12 is securely gripped between the tapered end 14 having the step cuts 15 and the tapered internal wall 17 of the coupling 13. The hose 12, being made of a suitable material such as textile reinforced rubber, can expand over the tapered end 14. Thus, the outside diameter of the tapered end 14 must be larger than the inside diameter of the hose 12. Once assembled, the collar 13 compresses the hose 12 against the tapered end 14. FIG. 5 shows the tapered step cut end 14 having step cuts 15 securely engaging the internal wall 16 of the hose 12. In addition, it can clearly be seen that the collar 13 having a tapered internal wall 17 provides a uniform contact surface thereby providing uniform compression of the hose 12 about the tapered end 14.

The coupling 10 further comprises an adapter 24 and a gasket 25. The gasket 25 is inserted into the open end of the pigtail 11 so as to seat on the step 26. The adapter 24 is then screwed into the coupling 18 of the pigtail 11. In this embodiment, the adapter 24 is shown to be a pipe coupling, however, other adapters may be used such as a swivel adapter or an NST adapter.

Figure 6:
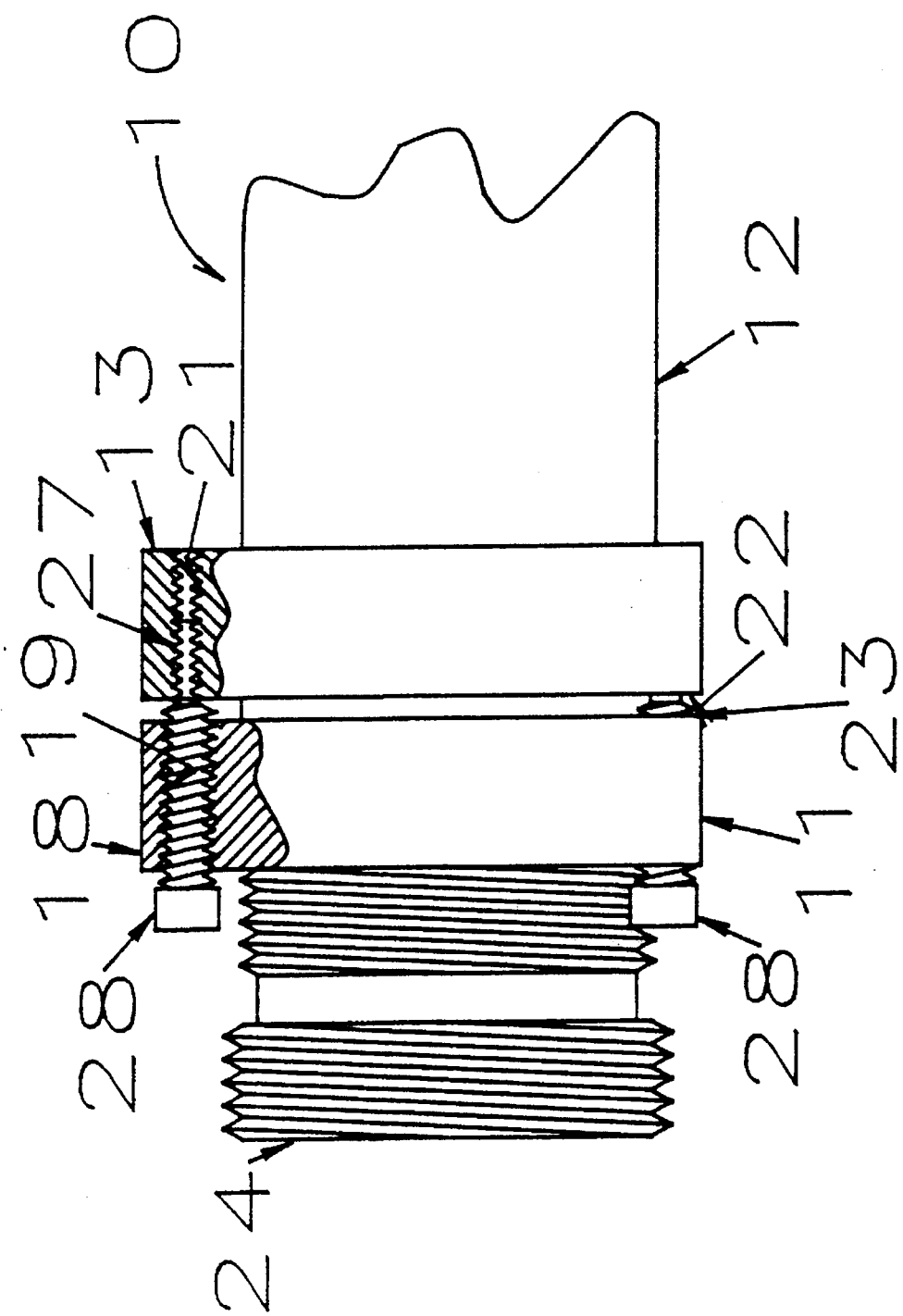
FIG. 6 is a partial section view of the present invention showing disassembly.

Turning now to FIG. 6, there is shown the coupling 10 being disassembled. First, cap screws 20 are removed from threaded hole 21 and set screws 27 (only one of which is shown in the partial section view) are inserted in its place. With the collar 13 still abutting the support ring 18 of pigtail 11 such that face 22 is contacting stop 23, cap screws 28, having a larger size than cap screws 20, are threaded into threaded clearance hole 19 (which is larger in diameter than threaded holes 21). Now, to remove the collar 13, cap screws 28 are turned such that the end of the cap screw 28 contacts the top of the set screw 27. The use of set screws 27 is optional; their purpose is merely to provide a bearing surface for the end of the cap screws 28. Further turning of the cap screw 28 causes the collar 13 to move away from the pigtail 11 to release the hose. It should be noted that the collar 13 moves relative to the pigtail 11 as well as the hose 12. That is, the tapered end 14 is still engaged in the end of the hose 12. Thus, once the collar 13 is slid well past the end of the tapered end 14, the pigtail 11 must be removed by working the pigtail 11 back and forth to remove the hose 12. Thus, no specialized tools are needed to remove (or assemble) the coupling 10.

What is claimed is:

1. A coupling (10) for connection to an end of a hose (12) comprising:

a collar (13), said collar (13) defining an axis and having a tapered internal surface (17) for placement over an end of such a hose (12) with an end of the tapered internal surface (17) having a larger diameter being closest to the end of that hose (12);

a hollow pigtail (11) defining an axis coaxial with the collar axis and having a tapered outer surface (14), for insertion into the end of such a hose (12), at one end thereof and a support ring (18) at an opposite end, said support ring (18) being connected to said collar (13) with the taper on said internal surface (17) being substantially parallel to the taper on said tapered outer surface (14), the tapers being dimensioned to cooperate with each other to clamp such a hose (12) throughout an overlapping length of said tapers;

at least two, first threaded fasteners (20) connecting said collar (13) to said support ring (18) of said pigtail (11) with the end of such a hose (12) clamped between the tapers thereof, said first fasteners (20) extending through threaded clearance holes (19), without engaging the threads thereof, in one of said collar (13) and said support ring (18) and threadingly engaging threaded holes (21) in the other of said collar (13) and said support ring (18), said holes (19, 21) each lying along an axis substantially parallel to each said pigtail axis and said coupling axis and being disposed to provide the desired clamping action of the hose; and, at least two, second threaded fasteners (28) larger in diameter than the first threaded fasteners (20) to threadingly engage said threaded clearance holes (19), upon removal of the first threaded fasteners (20) to push said collar (13) and said support ring (18) apart relative to one another to remove said collar (13) from said pigtail (11) to facilitate disassembly of said coupling (10) from a hose (12) clamped between the tapers.

2. A coupling (10) according to claim 1 wherein said tapered outer surface (14) has a plurality of steps (15) located about its periphery.

3. A coupling (10) according to claim 1 comprising an adapter (24) fitted to sealingly engage said coupling (10) at said support ring (18).

4. A coupling (10) according to claim 1 comprising a plurality of set screws (27) to threadingly engaging the smaller threaded holes (21) to provide bearing surfaces for said second threaded fasteners (28) to push against.

5. A coupling (10) according to claim 1 in combination with such a hose (12), the hose being clamped between said tapered outer surface 14 and said tapered internal surface (17).

6. A kit of parts for use as a coupling to an end of a hose comprising:

a collar (13), said collar (13) defining an axis and having a tapered internal surface (17) for placement over an end of such a hose (12) with an end of the tapered internal surface (17) having a larger diameter being closest to the end of that hose (12);

a hollow pigtail (11) defining an axis and having a tapered outer surface (14) at one end thereof and a support ring (18) at an opposite end, for insertion into the end of such a hose (12), for connection to said collar (13) with the said taper on said internal surface (17) substantially parallel to the taper on said tapered outer surface (14) to clamp such a said hose (12) throughout an overlapping length of the tapers;

at least two first threaded fasteners (20) for connecting said collar (13) to said support ring (18) of said pigtail (11) to clamp the end of such a hose (12) between the tapers, said first fasteners (20) extending through threaded clearance holes (19), without engaging the threads thereof, in one of said collar (13) and said support ring (18) and threadingly engaging threaded holes (21) in the other of said collar (13) and said support ring (18), said holes (19, 21) each lying along an axis substantially parallel to each said pigtail axis and said coupling axis and being disposed to provide the desired clamping action of the hose; and, at least two second threaded fasteners (28) larger in diameter than said first threaded fasteners (20) for threadingly engaging said threaded clearance holes (19) to push said collar (13) and said support ring (18) apart relative to one another to remove said collar (13) from said pigtail (11) to facilitate disassembly of said coupling (10) from a hose (12) when clamped between the tapers.

7. A kit of parts according to claim 6 comprising a plurality of set screws (27) for threading into the smaller threaded holes (21) to provide bearing surfaces for said second threaded fasteners (28) to push against.

8. A kit of parts according to claim 6 comprising an adapter (24), which when assembled, sealingly engaging said coupling (10) at said support ring (18).

9. A method of assembling and disassembling a coupling for a hose, said coupling comprising a) a collar (13) and a hollow pigtail having cooperating tapers to clamp said hose (12) throughout an overlapping length of said tapers; b) at least two first threaded fasteners (20) connecting said collar (13) to said support ring (18) to clamp an end of such a hose (12) between said tapers thereof, the first fasteners (20) extending through threaded clearance holes (19) in one of said collar (13) and said support ring (18) and threadingly engaging threaded holes (21) in the other of said collar (13) and said support ring (18), without the threads of said first fasteners (20) threadingly engaging the threads in said threaded clearance holes (19); and, c) at least two second threaded fasteners (28) larger in diameter than that of said first threaded fasteners (20) to threadingly engage said threaded clearance holes (19) to push said collar (13) and said support ring (18) apart relative to the other to disassemble said collar (13) from said pigtail (11), said assembly comprises the steps of:

a) inserting said collar (13) over said end of such a hose (12) such that an end of said taper having a larger diameter is adjacent the end of said hose (12) and inserting said tapered end (14) of said pigtail (11) into the end of said hose (12);

b) inserting at least two first threaded fasteners (20) through said threaded clearance holes (19) of one of said collar (13) and said support ring (18) and threading these into said threaded holes (21) in the other of said collar (13) and said support ring (18); and, c) tightening said threaded fasteners (20) until the tapers clamp the hose end; and disassembly comprises the steps of:

d) removing said first fasteners (20) from said threaded holes (21) with the hose end clamped between the tapers;

e) threading at least two second fasteners (28) into threaded clearance holes (19) in one of said collar (13) and said support ring (18); and, f) turning said second fasteners (28) to push said collar (13) and said support ring (18) apart relative to one another to remove said collar (13) from said pigtail (11).

10. A method according to claim 9 comprising the step of threading at least two set screws (27) into said threaded holes (21), after step d), to provide bearing surfaces for said second fasteners (28).

* * * * *